(12) United States Patent
Eskelinen (10) Patent No.: US 12,538,170 B2
(45) Date of Patent: Jan. 27, 2026

(54) PDU RATE REDUCTION IN MOBILE COMMUNICATIONS

(71) Applicant: MediaTek Singapore Pte. Ltd., Singapore (SG)

(72) Inventor: Jarkko Eskelinen, Oulu (FI)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 317 days.

(21) Appl. No.: 18/247,123

(22) PCT Filed: Sep. 30, 2021

(86) PCT No.: PCT/CN2021/122212
§ 371 (c)(1),
(2) Date: Mar. 29, 2023

(87) PCT Pub. No.: WO2022/073460
PCT Pub. Date: Apr. 14, 2022

(65) Prior Publication Data
US 2023/0413108 A1 Dec. 21, 2023

Related U.S. Application Data

(60) Provisional application No. 63/087,937, filed on Oct. 6, 2020.

(51) Int. Cl.
*H04W 28/06* (2009.01)
*H04L 1/1829* (2023.01)
(Continued)

(52) U.S. Cl.
CPC ........... *H04W 28/06* (2013.01); *H04L 1/1854* (2013.01); *H04L 1/1887* (2013.01); *H04W 28/0268* (2013.01); *H04W 80/02* (2013.01)

(58) Field of Classification Search
CPC ............... H04L 1/1854; H04L 1/1887; H04W 28/0268; H04W 28/06; H04W 80/02
See application file for complete search history.

(56) References Cited

U.S. PATENT DOCUMENTS 9,264,940 B2 2/2016 Liu et al.
10,652,147 B2 5/2020 Makineni et al.
(Continued)

FOREIGN PATENT DOCUMENTS

CN 1964362 A 5/2007
CN 102300256 A 12/2011
(Continued)

OTHER PUBLICATIONS

International Search Report and Written Opinion dated Dec. 30, 2021, issued in application No. PCT/CN2021/122212.
(Continued)

*Primary Examiner* — Syed Ali
(74) *Attorney, Agent, or Firm* — McClure, Qualey & Rodack, LLP (57) ABSTRACT

Various solutions for protocol data unit (PDU) rate reduction in mobile communications are described. A processor of an apparatus implementable in a user equipment (UE) generates a Packet Data Convergence Protocol (PDCP) data PDU containing a plurality of service data units (SDUs). The apparatus then transfers the PDCP data PDU to a receiver of the apparatus.

16 Claims, 5 Drawing Sheets

(51) Int. Cl.
  *H04L 1/1867* (2023.01)
  *H04W 28/02* (2009.01)
  *H04W 80/02* (2009.01)

(56) References Cited

U.S. PATENT DOCUMENTS

| | | | |
|---|---|---|---|
| 10,869,224 | B2 | 12/2020 | Zhao et al. |
| 11,606,717 | B2 | 3/2023 | Joseph |
| 2010/0189059 | A1 | 7/2010 | Yang |
| 2016/0381598 | A1* | 12/2016 | Chan ............. H04L 69/22 370/474 |
| 2017/0223578 | A1* | 8/2017 | Hong ............. H04L 1/18 |
| 2017/0311362 | A1* | 10/2017 | Hong ............. H04W 36/0085 |
| 2018/0077605 | A1* | 3/2018 | Maheshwari ..... H04L 69/324 |
| 2018/0124642 | A1* | 5/2018 | Phuyal ............. H04W 88/10 |
| 2018/0213461 | A1* | 7/2018 | Grayson ............. H04L 45/24 |
| 2018/0368021 | A1 | 12/2018 | Jung |
| 2019/0149638 | A1 | 5/2019 | Desai et al. |
| 2019/0174449 | A1* | 6/2019 | Shan ............. H04W 60/04 |
| 2019/0280826 | A1 | 9/2019 | Yi |
| 2019/0306884 | A1* | 10/2019 | Palat ............. H04W 74/0816 |
| 2019/0313271 | A1* | 10/2019 | Yiu ............. H04W 72/04 |
| 2020/0044792 | A1 | 2/2020 | Vaidya |
| 2020/0077470 | A1 | 3/2020 | Xiong et al. |
| 2020/0275311 | A1 | 8/2020 | Zhao |
| 2021/0006376 | A1 | 1/2021 | Cirik |
| 2021/0227579 | A1 | 7/2021 | Lee |
| 2021/0250808 | A1 | 8/2021 | Mitra |
| 2021/0282050 | A1 | 9/2021 | Adjakple |
| 2022/0225163 | A1 | 7/2022 | Sharma |
| 2022/0225428 | A1* | 7/2022 | Xiong ............. H04L 1/1896 |
| 2022/0286929 | A1 | 9/2022 | Park |
| 2022/0338227 | A1 | 10/2022 | Cirik |
| 2023/0070783 | A1 | 3/2023 | Hui |
| 2023/0362883 | A1 | 11/2023 | Park |

FOREIGN PATENT DOCUMENTS

| | | |
|---|---|---|
| CN | 102427446 A | 4/2012 |
| CN | 104812006 A | 7/2015 |
| CN | 106255153 A | 12/2016 |
| CN | 108696900 A | 10/2018 |
| CN | 110622451 A | 12/2019 |
| CN | 110945909 A | 3/2020 |
| WO | 2019/193154 A1 | 10/2019 |

OTHER PUBLICATIONS

Qualcomm Incorporated; "Further details of RLC protocol without concatenation;" 3GPP TSG-RAN WG2 Meeting #96 R2-168603; Nov. 2016; pp. 1-3.
International Search Report and Written Opinion dated Jan. 6, 2022, issued in application No. PCT/CN2021/122562.
Notice of Allowance dated Nov. 13, 2025, issued in application No. U.S. Appl. No. 18/247,319.

* cited by examiner

GENERATE A PACKET DATA CONVERGENCE PROTOCOL (PDCP) DATA PROTOCOL
DATA UNIT (PDU) CONTAINING A PLURALITY OF SERVICE DATA UNITS (SDUs)
510

CONCATENATE THE PLURALITY
OF SDUs IN GENERATING THE
PDCP DATA PDU
512

GENERATE THE PDCP DATA
PDU USING A PDCP DATA PDU
FORMAT WHICH HAS A MULTI-
PDU (mPDU) CONTAINER FIELD
OR A PLAIN mPDU FIELD
CONFIGURED TO CONTAIN THE
PLURALITY OF SDUs
514

GENERATE THE PDCP DATA PDU USING A PDCP
DATA PDU FORMAT WHICH HAS A PLAIN mPDU FIELD
CONFIGURED TO CONTAIN THE PLURALITY OF SDUs
FROM AN INTERNET PROTOCOL (IP) FLOW OR A
SERVICE DATA ADAPTATION PROTOCOL (SDAP)
DATA FLOW
516

TRANSMIT THE PDCP DATA PDU TO A RECEIVER
520

FIG. 5

PDU RATE REDUCTION IN MOBILE COMMUNICATIONS

CROSS REFERENCE TO RELATED PATENT APPLICATION

The present disclosure is part of a non-provisional application claiming the priority benefit of U.S. Patent Application No. 63/087,937, filed on 6 Oct. 2020, the content of which being incorporated by reference in its entirety.

TECHNICAL FIELD

The present disclosure is generally related to mobile communications and, more particularly, to techniques for protocol data unit (PDU) rate reduction in mobile communications.

BACKGROUND

Unless otherwise indicated herein, approaches described in this section are not prior art to the claims listed below and are not admitted as prior art by inclusion in this section.

The $3^{rd}$ Generation Partnership Project (3GPP) Technical Specification (TS) 38.323 in Chapter 6.1.1 specifies that a Packet Data Convergence Protocol (PDCP) data PDU may contain, in addition to a PDU header, one or more of the following: user plane data, control plane data, and a Message Authentication Code-Integrity (MAC-I). Moreover, Chapter 6.2.2 of the 3GPP TS 38.323 does not propose any means to transport multiple Service Data Adaptation Protocol (SDAP) service data units (SDUs) in one PDCP PDU. Specifically, Chapter 6 of the 3GPP TS 37.324 does not specify a way to transport multiple SDAP SDUs in one SDAP PDU. A Transmission Control Protocol (TCP) acknowledgement (ACK) is a TCP header with an ACK flag set. In an event that TCP ACK does not carry any data, it is an empty TCP ACK.

There is a one-to-one mapping between certain protocols, including: Internet Protocol (IP) packet from an upper layer (e.g., upper layer SDU) to PDCP SDAP SDU, PDCP SDAP SDU to PDCP SDAP data PDU, PDCP SDU to PDCP PDU, and PDCP PDU to Radio Link Control (RLC) SDU. When the size of an IP packet is small, such as a TCP ACK with less than 100 bytes, the one-to-one mapping tends to result in high SDU/PDU rates in TCP, User Datagram Protocol (UDP), IP, SDAP, PDCP and RLC layers of protocol. The same issue may also occur on network-side peer entities and generally any layer processing packet-based data. Overhead related to transmission, receiving, synchronizing and processing per SDU/PDU tends to become dominant when the amount of data per SDU/PDU decreases (e.g., less payload but more header information). TCP ACK is an extreme example, where the amount of payload data is zero while the header size is 40 bytes for IPv4.

The ratio of TCP forward link TCP data packet to TCP reverse link TCP ACK packet is ½ (e.g., one TCP ACK for every second TCP data packet), and this is due to delayed ACK algorithm specified in Request for Comments (RFC) 1122. For 100 Mbps TCP data forward flow with 1400-byte maximum transfer unit (MTU) with around 9000 TCP data packets per second, approximately 4500 reverse TCP ACK would be sent. While 40 to 60 bytes of ACK data (in IPv4) may not be much, the rate of such ACK flow can become high due to the fact that downlink data rate is high. The ratio of TCP data to ACK throughput can be about 20. For 100 Mbps forward TCP data, there would be 5 Mbps of reverse flow ACK traffic. The issue of TCP ACK rate could be worsened by the fact that a number of TCP ACKs get buffered in a user equipment (UE) before the network grants uplink resource(s) for uplink transmission. When the grant is received by the UE, the UE needs to fill the grant with TCP ACKs, thereby resulting in MTU/ACK size=1400 bytes/40 bytes=35 times higher packet rate compared to regular TCP data using MTU-size packets. Therefore, there is a need for a solution to reduce PDU rate in mobile communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions for PDU rate reduction in mobile communications.

In one aspect, a method may involve generating a PDCP data PDU containing a plurality of SDUs. The method may also involve transferring the PDCP data PDU to a receiver.

In another aspect, an apparatus may include a transceiver and a processor coupled to the transceiver. The transceiver may be configured to wirelessly communicate with a network. The processor may be configured to generate a PDCP data PDU containing a plurality of SDUs. The processor may also be configured to transfer the PDCP data PDU to a receiver. In generating the PDCP data PDU, the processor may be configured to either concatenate the plurality of SDUs in generating the PDCP data PDU or generate the PDCP data PDU using a PDCP data PDU format which has a multi-PDU (mPDU) container field or a plain mPDU field configured to contain the plurality of SDUs.

It is noteworthy that, although description provided herein may be in the context of certain radio access technologies, networks and network topologies such as 5th Generation (5G) New Radio (NR) mobile communications, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Narrow Band Internet of Things (NB-IoT), Industrial Internet of Things (IIoT), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to PDU rate reduction in mobile communications. According to the present disclosure, a number of possible solutions may be implemented separately or jointly. That is, although these possible solutions may be described below separately, two or more of these possible solutions may be implemented in one combination or another.

Figure 1:
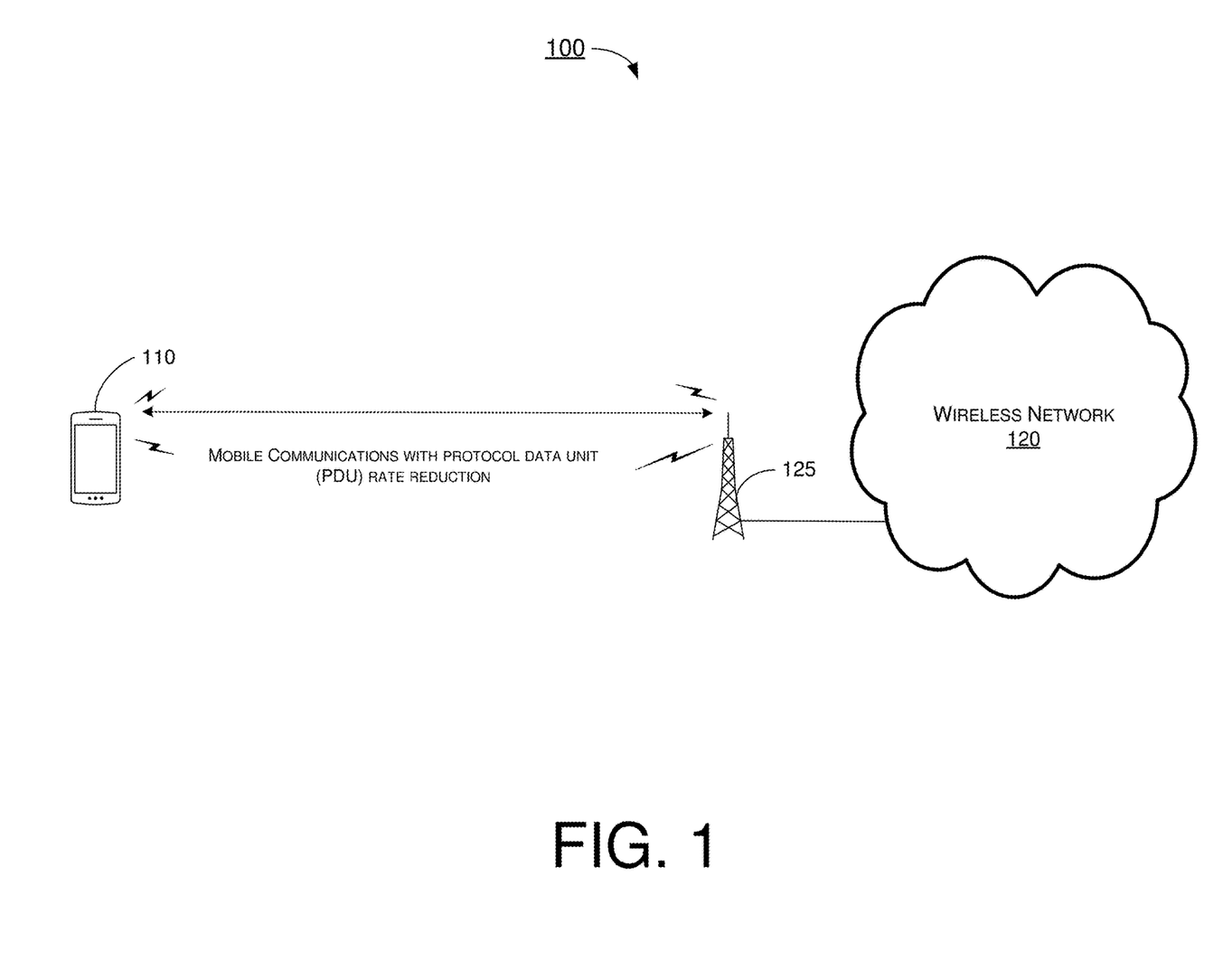
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. Referring to FIG. 1, network environment 100 may involve a user equipment (UE) 110 in wireless communication with a wireless network 120 (e.g., a 5G NR mobile network or another type of network such as a non-terrestrial network (NTN)). UE 110 may be in wireless communication with wireless network 120 via a base station or network node 125 (e.g., an eNB, gNB, transmit-receive point (TRP) or satellite). In network environment 100, UE 110 and wireless network 120 may implement various schemes pertaining to PDU rate reduction in mobile communications, as described below.

Under a proposed scheme in accordance with the present disclosure, multiple consecutive upper layer SDUs related to a same SDAP/PDCP flow may be transferred in a PDCP data PDU (e.g., with one-to-multiple mapping) using either of a first approach or a second approach. In the first approach, the multiple consecutive upper layer SDUs may be concatenated to one PDCU data PDU. In the second approach, one or more PDCP PDU formats may be utilized to transfer multiple SDAP SDUs in a PDCP data PDU.

With respect to the first approach, a PDCP layer or entity at UE 110 may concatenate several SDAP SDUs to a single PDU (herein interchangeably referred to as "multi-PDU" or "mPDU") and then forward the mPDU to a peer PDCP entity. The number of concatenated SDUs per PDU may be configurable and may depend on the available SDUs in a PDCP buffer at the time of concatenation. For example, concatenation may be performed when wireless network 120 issues a grant to UE 110 to transmit and, accordingly, the PDCP layer/entity at UE 110 may perform selective quality of service (QoS) flow based on concatenation and/or forwarding (e.g., concatenate for non-time-critical flows). Alternatively, or additionally, concatenation may be performed in case a set amount of data to be concatenated is buffered (e.g., counter-based concatenation criterion) and/or in case a set amount of time has elapsed from a previous instance of concatenation (e.g., timer-based concatenation criterion). Moreover, in the first approach, concatenation may be performed for certain flows selectively. For instance, the PDCP layer/entity may determine not to concatenate SDUs from a given IP flow due to QoS characteristics (e.g., not to concatenate for a real-time traffic or time-critical traffic). Under the proposed scheme, TCP ACKs may be concatenated and forwarded immediately to improve TCP forward link performance.

Figure 2:
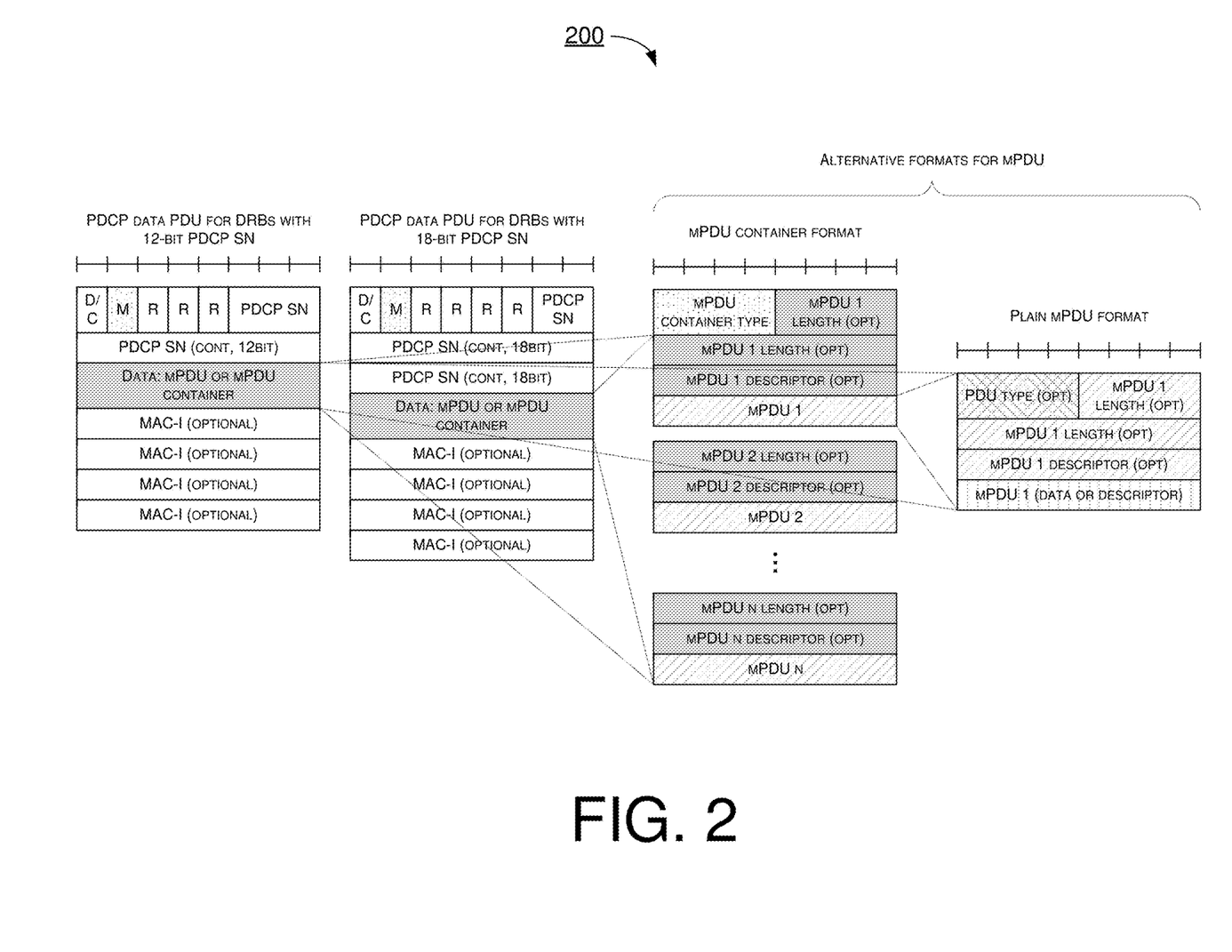
FIG. 2 is a diagram of an example scenario under a proposed scheme in accordance with the present disclosure.

With respect to the second approach, a new 'PDCP data PDU' format may be utilized, with the new PDCP data PDU containing a 'Plain mPDU' or a 'mPDU container'. FIG. 2 illustrates an example scenario 200 of an implementation of the second approach under the proposed scheme. Referring to FIG. 2, the mPDU may contain one PDCP SDU of multiple concatenated PDCP SDUs. Under the proposed scheme, the data format of a PDCP data PDU may be indicated to a receiver or receiving entity by one or more of number of ways, including: (i) using an R field in a header of the PDCP data PDU to include a new bit M (in octet 1); (ii) being agreed by signaling; (iii) being indicated by dynamically using a header in PDCP data field; and (iv) using a header in the 'plain mPDU' or 'mPDU container' (e.g., mPDU container, plain mPDU, PDCP data PDU, PDCP control PDU or the like).

Under the proposed scheme, a 'mPDU container may carry one or many PDCP SDUs for a PDU session. A mPDU type field may indicate the type of a number of mPDUs (e.g., mPDU 1~n) such as, for example and without limitation, mPDU container, plain mPDU, PDCP data PDU, SDAP PDU, TCP ACK PDU, user data convergence (UDC) PDU, Ethernet PDU, and so on. The use of mPDU type may be agreed upon or signaled. Moreover, an optional mPDU descriptor field may be utilized to carry information needed to synchronize PDCP entities. The information carried may include, for example and without limitation, TCP ACK compression context information or ethernet header compression information. The total length and the length of individual included mPDU may be indicated to the receiver/receiving entity.

Under the proposed scheme, a 'plain mPDU' may contain a SDAP SDU mapped to a PDU session. An optional PDU type field may be used to indicate the type of PDU(s) carried by the plain mPDU such as, for example and without limitation, PDCP control, PDCP data, TCP ACK, Ethernet, UDC, and the like. For instance, the PDU type field may indicate that the included 'mPDU 1~n' contain PDCP PDU or another PDU type. Additionally, an optional mPDU descriptor field may be used to carry information needed to synchronize PDCP entities. The information carried may include, for example and without limitation, TCP ACK compression context information or ethernet header compression information. The length of the mPDU may be indicated to the receiver/receiving entity.

Figure 3:
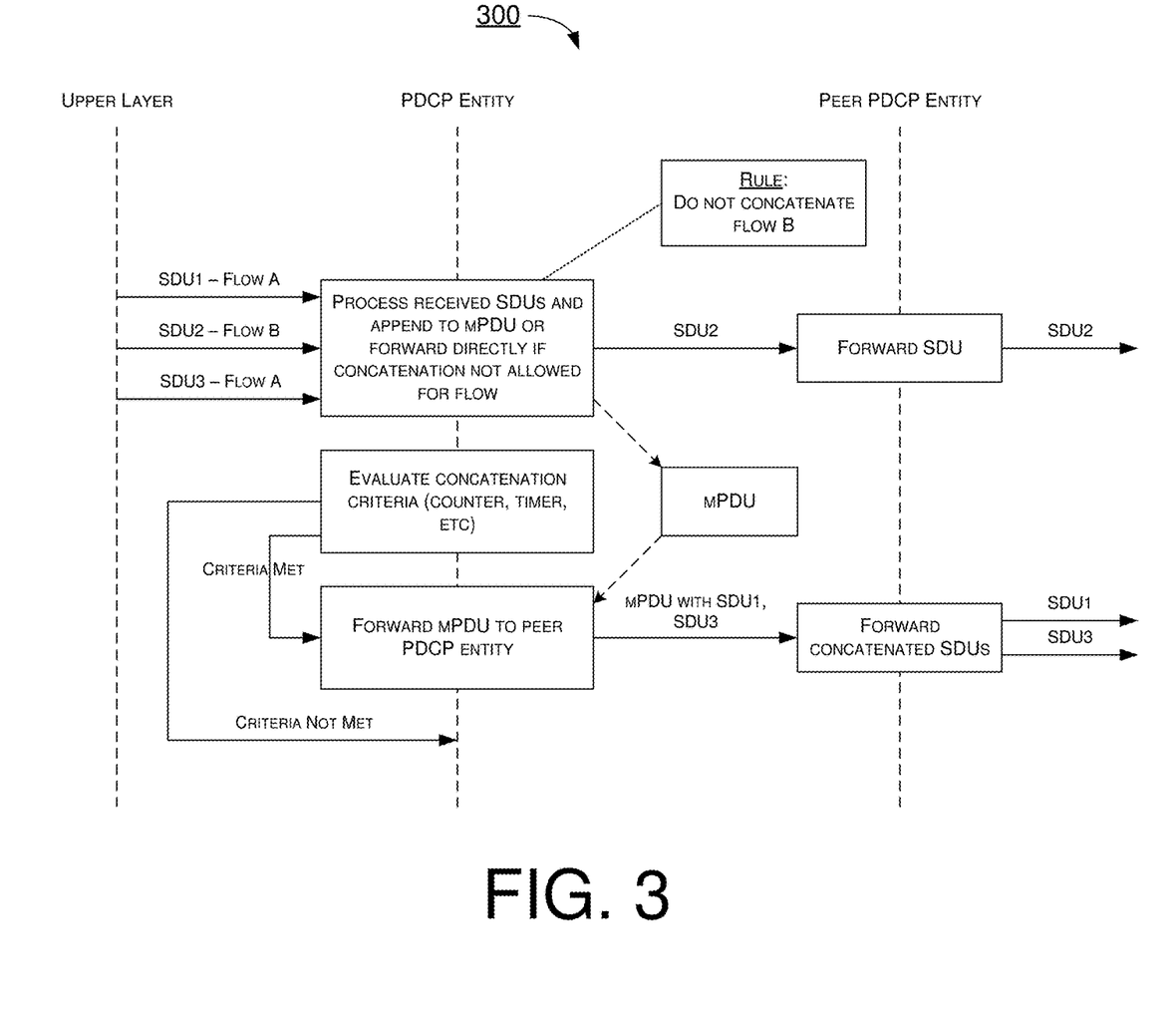
FIG. 3 is a diagram of an example scenario under a proposed scheme in accordance with the present disclosure.

FIG. 3 illustrates an example scenario 300 of an implementation of the first approach under the proposed scheme. In the example shown in FIG. 3, a rule may be predefined such that concatenation may be performed only for flow A (e.g., non-time-critical traffic) but not flow B (e.g., real-time traffic or time-critical traffic), and flow B is to be forwarded immediately without concatenation latency. Referring to FIG. 3, a PDCP layer or entity at UE 110 receives SDUs from flow A and flow B in a random order (e.g., SDU1 from flow A, SDU2 from flow B, and SDU3 from flow A). On one hand, the PDCP layer/entity appends the SDU(s) from flow A (e.g., SDU1 and SDU3) to be concatenated into mPDU. On the other hand, the PDCP layer/entity forwards the SDU(s) from flow B (e.g., SDU2) immediately without delay. The PDCP layer/entity at UE 110 continues to collect SDU data until one or more concatenation criteria (e.g., counter-based concatenation criterion and/or timer-based concatenation criterion) are met. In this example, when network node 125 schedules a grant for UE 110 to transmit data or when the timer or counter-based criterion is met, the PDCP entity triggers forwarding of the mPDU. The PDCP entity at UE 110 creates and forwards an mPDU with SDU1 and SDU3 to a peer PDCP entity. More specifically, the PDCP entity places each SDU in a mPDU container and executes a number of tasks, including: (i) setting mPDU container type field as 'mPDU container'; (ii) setting mPDU container total length according to length of the SDUs (e.g., SDU1 and SDU3); and (iii) setting mPDU descriptor to include information of PDCP entity state (e.g., count, sequence number (SN), and so on) and/or QoS flow identifier (QFI) of packets in the mPDU container. The PDCP entity then forwards PDCP data PDU with the mPDU to the peer PDCP entity over a link layer. The peer PDCP entity may then forward individual SDUs to a receiver/receiving entity.

Illustrative Implementations

Figure 4:
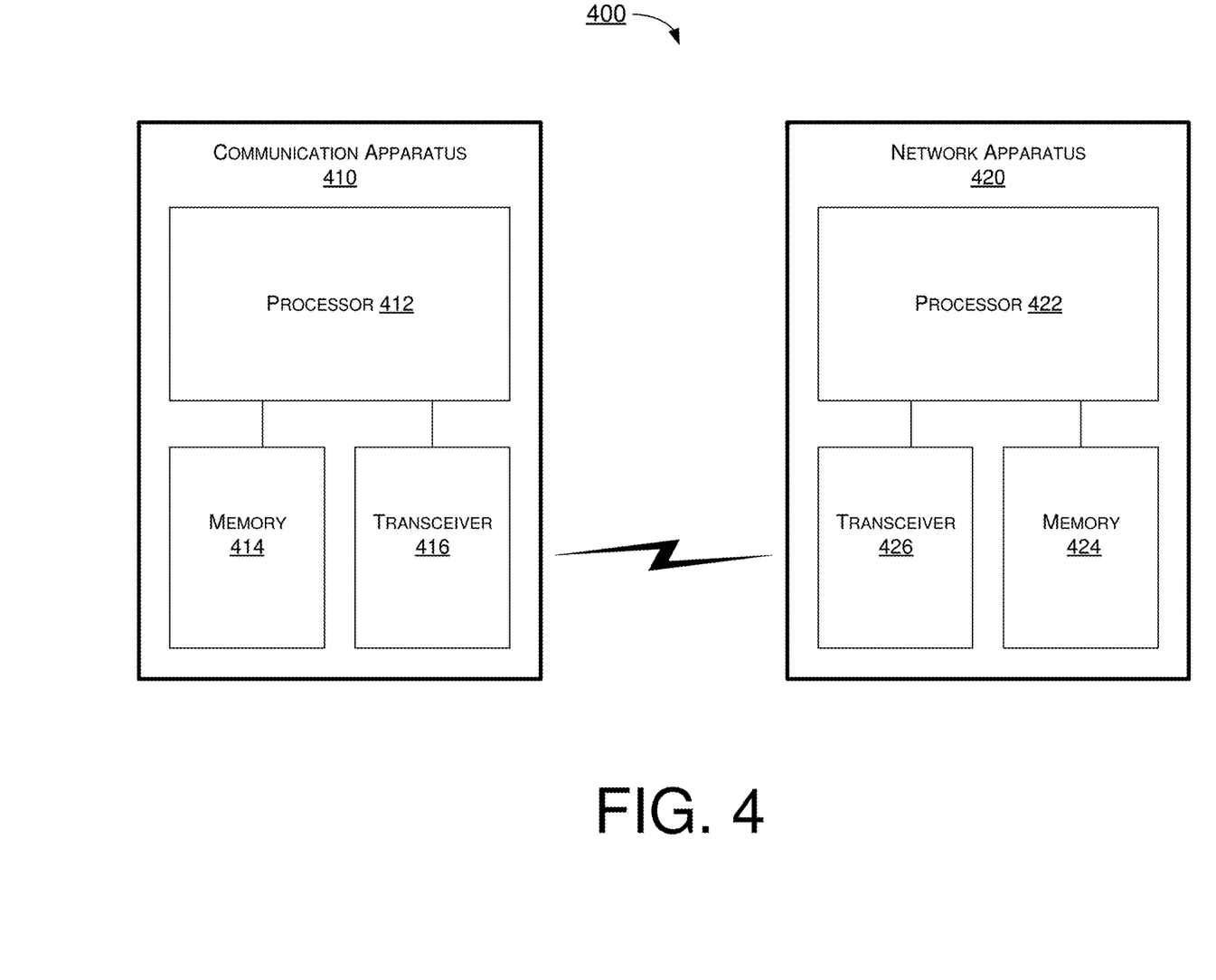
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to PDU rate reduction in mobile communications, including scenarios/schemes described above as well as processes described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT, NB-IoT, IIoT or NTN apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus/station, which may be a network node such as a base station, a small cell, a router, a gateway or a satellite. For instance, network apparatus 420 may be implemented in an eNodeB in an LTE, in a gNB in a 5G, NR, IoT, NB-IoT, IIoT, or in a satellite in an NTN network. Alternatively, network apparatus 420 may be implemented in the form of one or more IC chips such as, for example and without limitation, one or more single-core processors, one or more multi-core processors, or one or more RISC or CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively.

Each of communication apparatus 410 and network apparatus 420 may be a communication entity capable of communicating with each other using various proposed schemes in accordance with the present disclosure. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE (e.g., UE 110) and network apparatus 420 is implemented in or as a network node or base station (e.g., network node 125) of a communication network (e.g., wireless network 120). It is also noteworthy that, although the example implementations described below are provided in the context of mobile communications, the same may be implemented in other types of networks.

Under a proposed scheme pertaining to PDU rate reduction in mobile communications in accordance with the present disclosure, with communication apparatus 410 implemented in or as UE 110 and network apparatus 420 implemented in or as network node 125 in network environment 100, processor 412 of communication apparatus 410 may generate a PDCP data PDU containing a plurality of SDUs. Additionally, processor 412 may transfer the PDCP data PDU to a receiver.

In some implementations, the plurality of SDUs may include a plurality of consecutive upper-layer SDUs related to a same SDAP data flow.

In some implementations, in generating the PDCP data PDU, processor 412 may concatenate the plurality of SDUs in generating the PDCP data PDU. In some implementations, in concatenating the plurality of SDUs, processor 412 may selectively concatenate one or more flows of SDUs in generating the PDCP data PDU such that a first flow of SDUs associated with a first QoS ID is concatenated and a second flow of SDUs associated with a second QoS ID is not concatenated. For instance, the first flow may be associated with a non-time-critical traffic, and the second flow may be associated with a real-time traffic or a time-critical traffic.

In some implementations, a number of the plurality of SDUs that are concatenated may be based on available SDUs in a PDCP buffer at a time of the concatenating. It is noteworthy that SDUs may not be in the PDCP buffer but may arrive and be concatenated at the time of arrival. Alternatively, or additionally, a number of the plurality of SDUs that are concatenated is based on either or both of: (a) an amount of data being concatenated based on a counter, and (b) an amount of time elapsed from a previous concatenation based on a timer.

In some implementations, in generating the PDCP data PDU, processor 412 may generate the PDCP data PDU using a PDCP data PDU format which has a mPDU container field containing a plurality of plain mPDUs from one or more IP flows. In such cases, a predetermined bit in a header of the PDCP data PDU may be set to indicate the PDCP data PDU format as having the mPDU container field that contains the plurality of plain mPDUs. Additionally, the PDCP data PDU format may be agreed with the network by signaling using a PDCP control PDU. Moreover, in transferring the PDCP data PDU, processor 412 may dynamically indicate the PDCP data PDU format using a header in a data field of the PDCP data PDU. Furthermore, the plain mPDUs may contain the plurality of SDUs associated with a PDU session.

In some implementations, in generating the PDCP data PDU, processor 412 may generate the PDCP data PDU using a PDCP data PDU format which has a plain mPDU field configured to contain the plurality of SDUs from an IP flow or a SDAP data flow. In such cases, a predetermined bit in a header of the PDCP data PDU is set to indicate the PDCP data PDU format as having the plain mPDU field that contains the plurality of SDUs. Additionally, the PDCP data PDU format may be agreed with the network by signaling using a PDCP control PDU. Moreover, in transferring the PDCP data PDU, processor 412 may dynamically indicate the PDCP data PDU format using a header in a data field of the PDCP data PDU. Furthermore, a header in the plain mPDU field may be set to indicate the PDCP data PDU format as having the plain mPDU field that contains the plurality of SDUs. Also, the plain mPDU field may contain a SDAP SDU associated with a PDU session.

Illustrative Processes

Figure 5:
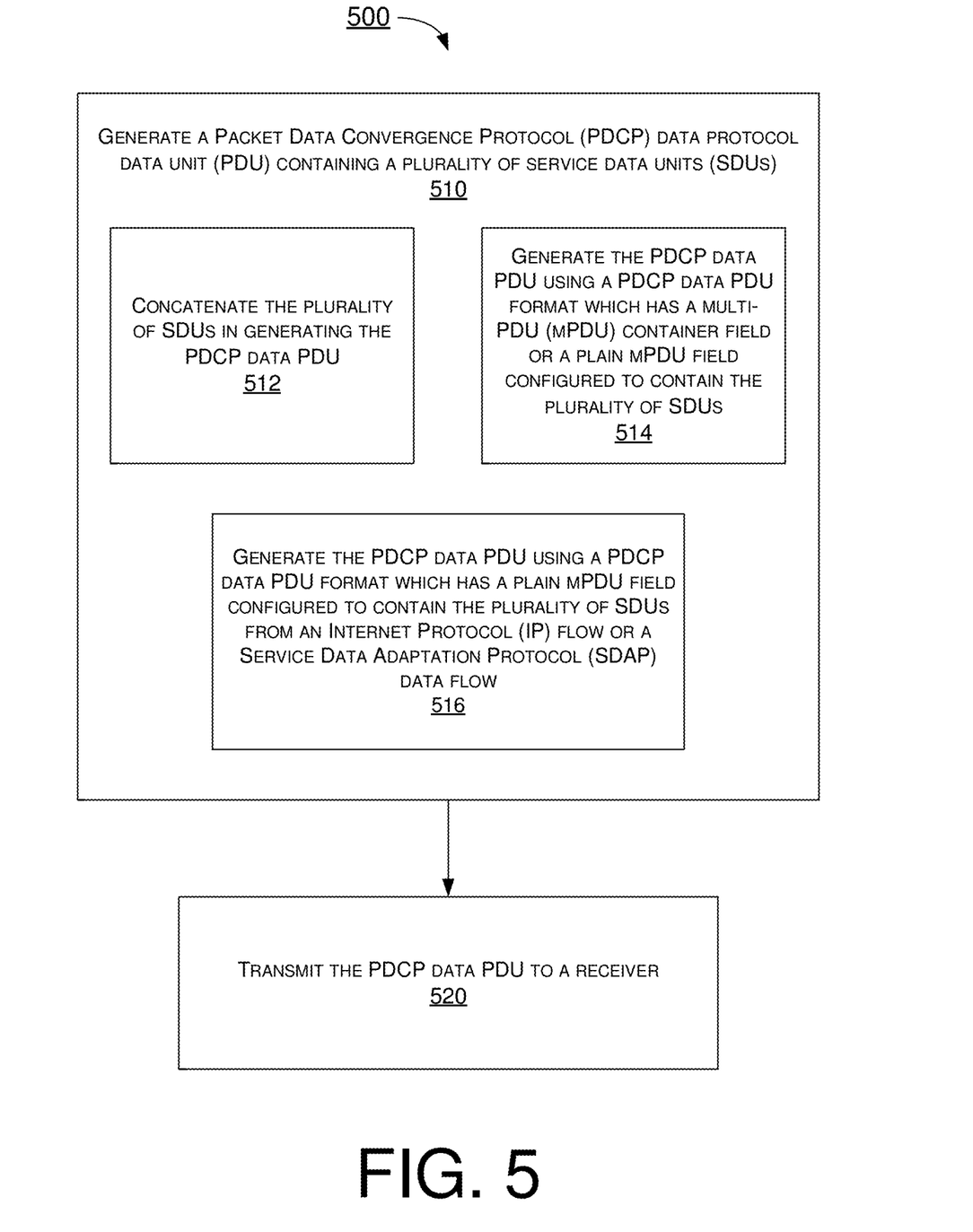
FIG. 5 is a flowchart of an example process in accordance with an implementation of the present disclosure.

FIG. 5 illustrates an example process 500 in accordance with an implementation of the present disclosure. Process 500 may be an example implementation of schemes described above whether partially or completely, with respect to PDU rate reduction in mobile communications in accordance with the present disclosure. Process 500 may represent an aspect of implementation of features of communication apparatus 410 and network apparatus 420. Process 500 may include one or more operations, actions, or functions as illustrated by one or more of blocks 510 and 520 as well as sub-blocks 512, 514 and 516. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 410 and network apparatus 420. Process 500 may begin at block 510.

At 510, process 500 may involve processor 412 of communication apparatus 410, implemented in or as UE 110, generating a PDCP data PDU containing a plurality of SDUs. Process 500 may proceed from 510 to 520.

At 520, process 500 may involve processor 412 transferring the PDCP data PDU to a receiver.

In some implementations, the plurality of SDUs may include a plurality of consecutive upper-layer SDUs related to a same SDAP data flow.

In some implementations, in generating the PDCP data PDU, process 500 may involve processor 412 performing one of several different operations, as represented by 512, 514 and 516.

At 512, in generating the PDCP data PDU, process 500 may involve processor 412 concatenating the plurality of SDUs in generating the PDCP data PDU. In some implementations, in concatenating the plurality of SDUs, process 500 may involve processor 412 selectively concatenating one or more flows of SDUs in generating the PDCP data PDU such that a first flow of SDUs associated with a first QoS ID is concatenated and a second flow of SDUs associated with a second QoS ID is not concatenated. For instance, the first flow may be associated with a non-time-critical traffic, and the second flow may be associated with a real-time traffic or a time-critical traffic. In some implementations, a number of the plurality of SDUs that are concatenated may be based on available SDUs in a PDCP buffer at a time of the concatenating. It is noteworthy that SDUs may not be in the PDCP buffer but may arrive and be concatenated at the time of arrival. Alternatively, or additionally, a number of the plurality of SDUs that are concatenated is based on either or both of: (a) an amount of data being concatenated based on a counter, and (b) an amount of time elapsed from a previous concatenation based on a timer.

At 514, in generating the PDCP data PDU, process 500 may involve processor 412 generating the PDCP data PDU using a PDCP data PDU format which has a mPDU container field containing a plurality of plain mPDUs from one or more IP flows. In such cases, a predetermined bit in a header of the PDCP data PDU may be set to indicate the PDCP data PDU format as having the mPDU container field that contains the plurality of plain mPDUs. Additionally, the PDCP data PDU format may be agreed with the network by signaling using a PDCP control PDU. Moreover, in transferring the PDCP data PDU, process 500 may involve processor 412 dynamically indicating the PDCP data PDU format using a header in a data field of the PDCP data PDU. Furthermore, the plain mPDUs may contain the plurality of SDUs associated with a PDU session.

At 516, in generating the PDCP data PDU, process 500 may involve processor 412 generating the PDCP data PDU using a PDCP data PDU format which has a plain mPDU field configured to contain the plurality of SDUs from an IP flow or a SDAP data flow. In such cases, a predetermined bit in a header of the PDCP data PDU is set to indicate the PDCP data PDU format as having the plain mPDU field that contains the plurality of SDUs. Additionally, the PDCP data PDU format may be agreed with the network by signaling using a PDCP control PDU. Moreover, in transferring the PDCP data PDU, process 500 may involve processor 412 dynamically indicating the PDCP data PDU format using a header in a data field of the PDCP data PDU. Furthermore, a header in the plain mPDU field may be set to indicate the PDCP data PDU format as having the plain mPDU field that contains the plurality of SDUs. Also, the plain mPDU field may contain a SDAP SDU associated with a PDU session.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

The invention claimed is:

1. A method, comprising:
generating a Packet Data Convergence Protocol (PDCP) data protocol data unit (PDU) containing a plurality of service data units (SDUs); and
transferring the PDCP data PDU to a receiver;
wherein the generating of the PDCP data PDU comprises concatenating the plurality of SDUs in generating the PDCP data PDU;
wherein the concatenating of the plurality of SDUs comprises selectively concatenating one or more flows of SDUs in generating the PDCP data PDU such that a first flow of SDUs associated with a first quality-of-service (QOS) identifier (ID) is concatenated and a second flow of SDUs associated with a second QoS ID is not concatenated,
wherein the generating of the PDCP data PDU comprises generating the PDCP data PDU using a PDCP data PDU format which has a multi-PDU (mPDU) container field containing a plurality of plain mPDUs from one or more data flows.

2. The method of claim 1, wherein the plurality of SDUs comprise a plurality of consecutive upper-layer SDUs related to a same Service Data Adaptation Protocol (SDAP) data flow.

3. The method of claim 1, wherein the first flow is associated with a non-time-critical traffic and the second flow is associated with a real-time traffic or a time-critical traffic.

4. The method of claim 1, wherein a number of the plurality of SDUs that are concatenated is based on available SDUs in a PDCP buffer at a time of the concatenating.

5. The method of claim 1, wherein a number of the plurality of SDUs that are concatenated is based on either or both of:
an amount of data being concatenated based on a counter, and
an amount of time elapsed from a previous concatenation based on a timer.

6. The method of claim 1, wherein a predetermined bit in a header of the PDCP data PDU is set to indicate the PDCP data PDU format as having the mPDU container field that contains the plurality of plain mPDUs.

7. The method of claim 1, wherein the PDCP data PDU format is agreed with the network by signaling using a PDCP control PDU.

8. The method of claim 1, wherein the transferring of the PDCP data PDU comprises dynamically indicating the PDCP data PDU format using a header in a data field of the PDCP data PDU.

9. The method of claim 1, wherein the plain mPDUs contain the plurality of SDUs associated with a PDU session.

10. The method of claim 1, wherein the generating of the PDCP data PDU comprises generating the PDCP data PDU using a PDCP data PDU format which has a plain mPDU field configured to contain the plurality of SDUs from an Internet Protocol (IP) flow or a Service Data Adaptation Protocol (SDAP) data flow.

11. The method of claim 10, wherein a predetermined bit in a header of the PDCP data PDU is set to indicate the PDCP data PDU format as having the plain mPDU field that contains the plurality of SDUs.

12. The method of claim 10, wherein the PDCP data PDU format is agreed with the network by signaling using a PDCP control PDU.

13. The method of claim 10, wherein the transferring of the PDCP data PDU comprises dynamically indicating the PDCP data PDU format using a header in a data field of the PDCP data PDU.

14. The method of claim 10, wherein a header in the plain mPDU field is set to indicate the PDCP data PDU format as having the plain mPDU field that contains the plurality of SDUs.

15. The method of claim 10, wherein the plain mPDU field contains a Service Data Adaptation Protocol (SDAP) SDU associated with a PDU session.

16. An apparatus implementable in a user equipment (UE), comprising:
a transceiver configured to wirelessly communicate with a network; and
a processor coupled to the transceiver and configured to perform operations comprising:
generating a Packet Data Convergence Protocol (PDCP) data protocol data unit (PDU) containing a plurality of service data units (SDUs); and
transferring the PDCP data PDU to a receiver,
wherein, in generating the PDCP data PDU, the processor is configured to perform either:
concatenating the plurality of SDUs in generating the PDCP data PDU; or
generating the PDCP data PDU using a PDCP data PDU format which has a multi-PDU (mPDU) container field or a plain mPDU field configured to contain the plurality of SDUs;
wherein, in concatenating the plurality of SDUs, the processor selectively concatenates one or more flows of SDUs in generating the PDCP data PDU such that a first flow of SDUs associated with a first quality-of-service (QOS) identifier (ID) is concatenated and a second flow of SDUs associated with a second QoS ID is not concatenated,
wherein the generating of the PDCP data PDU comprises generating the PDCP data PDU using a PDCP data PDU format which has a multi-PDU (mPDU) container field containing a plurality of plain mPDUs from one or more data flows.

* * * * *